Figure 1:
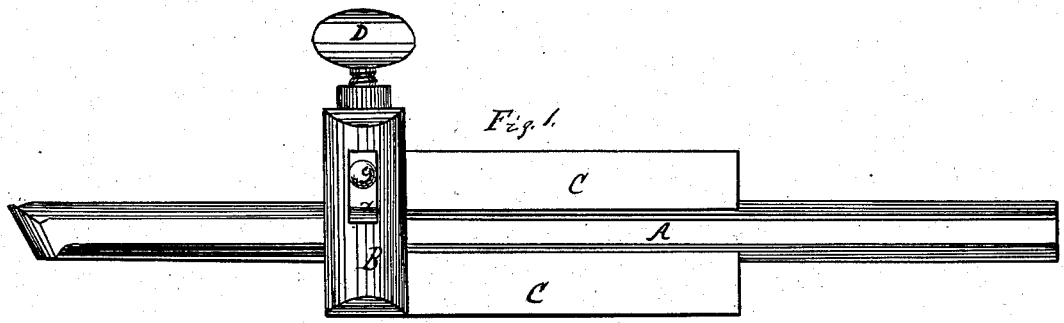
Figure 2:
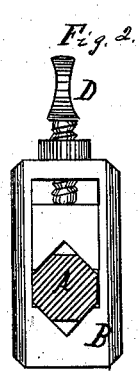
Figure 3:
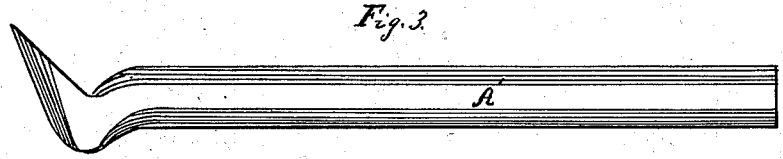

J. BAILLIE.
LATHE TOOL HOLDER.

No. 74,877. Patented Feb. 25, 1868.

Witnesses.
W. D. Stockbridge
A. A. Leatman

Inventor.
John Baillie
per
Alexander A. Mason
Atty

United States Patent Office.

JOHN BAILLIE, OF SALEM, OHIO.

Letters Patent No. 74,877, dated February 25, 1868.

IMPROVEMENT IN LATHE-TOOL HOLDER.

The Schedule referred to in these Letters Patent and making part of the same.

TO ALL WHOM IT MAY CONCERN:

Be it known that I, JOHN BAILLIE, of Salem, in the county of Columbiana, and in the State of Ohio, have invented certain new and useful Improvements in Tools and Bearing for Lathes; and do hereby declare that the following is a full, clear, and exact description thereof, reference being had to the accompanying drawings, and the letters of reference marked thereon.

In the annexed drawings, making a part of this specification, A represents an ordinary side-cutter, and A' an ordinary cutting-tool for lathes, the shanks of which are made octagonal, but may be of any desired shape and size. B represents a metallic loop or clasp, provided with slots, $x$, in the sides thereof, and a thumb-screw, D, in the top. C C represent metallic bars or holders, each provided with an angular groove in the side, which come together, for the purpose of clasping the tool A, and holding the same firm between them, as a socket therefor. One of the holders C is rigidly secured to the bottom of the clasp B, and the other fits between the sides thereof, and is held there, and works up and down by means of a pin, $c$, working in the slot $x$. It will be seen that by loosening the thumb-screw D, the holders C C are loosened on the shank of the tool A, which may then be removed, and another inserted, of the same or different size, and then, by means of the said thumb-screw, the holders C C are again pressed together against the tool, and hold it, as before stated. This device may be secured in any manner most convenient, to a tool-post of a lathe of any description.

Having thus fully described my invention, what I claim as new, and desire to secure by Letters Patent, is—

The holders C C, when used in combination with the slotted clasp B and thumb-screw D, substantially as and for the purpose herein set forth.

In testimony that I claim the foregoing, I have hereunto set my hand, this 27th day of December, 1867.

JOHN BAILLIE.

Witnesses:
R. H. GARRIGUES,
CHAS. H. GARRIGUES.